United States Patent [19]

Robson

[11] 3,958,063

[45] May 18, 1976

[54] COMPOSITE PARTICLE HAVING SURFACE RECESSING OR INDENTATION

[76] Inventor: Bruce H. Robson, Cilandak Garden Estates, Jalan Taman D-2, Cilandak, Kebayoran Baru, Jakarta Selantan, Indonesia

[22] Filed: Jan. 16, 1974

[21] Appl. No.: 433,664

[52] U.S. Cl. ............................. 428/329; 156/77; 156/155; 156/311; 264/44; 428/144; 428/148; 428/166; 428/242; 428/404
[51] Int. Cl.² .................. B32B 19/04; B32B 17/00; B32B 7/14
[58] Field of Search ............... 51/298.1; 161/168; 156/77, 7, 155, 311; 264/125, 44; 117/8; 428/328, 329, 131, 134, 138, 144, 148, 145, 166, 403, 404, 240–242

[56] References Cited
UNITED STATES PATENTS

| | | |
|---|---|---|
| 2,194,472 | 3/1940 | Jackson ........................... 51/298.1 |
| 2,216,728 | 10/1940 | Benner et al. ........................ 51/295 |
| 2,740,725 | 4/1956 | Ball ..................................... 51/298.1 |
| 3,093,503 | 6/1963 | Laszlo .................................. 156/7 X |
| R21,252 | 10/1939 | Kistler ............................. 264/125 X |

*Primary Examiner*—Harold Ansher
*Attorney, Agent, or Firm*—Dunlap, Codding & McCarthy

[57] ABSTRACT

A particle having superior bonding properties comprising crystalline portions connected together by a bonding material. The bonding material is relieved at the surface of the particle to provide capillaries extending into the particle between adjacent crystals. This results in the fusing material having a terminal surface recessed from the surface of the particle. The particle, when added to an elastomeric material, achieves superior mechanical, chemical and vacumatic bond strength as the elastomeric material is anchored to the particles by occupation of the capillaries, achieving increased bonding area.

2 Claims, 4 Drawing Figures

COMPOSITE PARTICLE HAVING SURFACE RECESSING OR INDENTATION

BACKGROUND OF THE INVENTION

1. Field of the Invention

This invention relates to an improved particle and the methods of making same, the particle being characterized as being extremely hard and abrasive, while also having improved surface capillarity. More particularly, but not by way of limitation, the invention relates to an improved particle comprising a plurality of crystals connected together by a bonding material that has been partially removed to provide surface capillarity. The resulting particle is one which affords improved mechanical, chemical and vacuatic bonding as the particle is added to an elastomeric material.

2. Description of the Prior Art

There have been many developments in the art of tire manufacturing and other uses of elastomers to improve the life cycle and/or traction ability of an article as the surface of that article is in contacting engagement with a foreign surface. It is known that high product wear occurs in such operations as: a tire in rolling or braking engagement with a road surface; a conveyor belt carrying objects up or down an incline; and, pulley belts operating under heavy surface loads. These are given by way of example only, and by no means do these exhaust the myriad of resilient material usages that have been improved by the addition of abrasive particulate matter to elastomeric materials.

There are two reasons for adding an abrasive material to resilient material that will be considered herein. The first reason is to provide articles made from elastomeric material that have particles dispersed within the elastomer wherein there is low bonding strength to the elastomer. As the surface of the elastomeric article wears away (such as when a tire tread wearingly contacts a road), successive layers of elastomer are exposed; as each layer is exposed, a number of the particles are brought to the surface. Since the particles have low bonding strength to the elastomer, they fall away, and the surface is marked by voids left behind by the removed particles. This kind of phenomenon gives roughened surfaces and improved gripping effectiveness, and an automobile tire made of this type of elastomer-particle material experiences increased traction with a highway surface. Examples of particles used in elastomeric materials to give this result are wood, cork, salt and sand.

The second reason, to which reference was above made, for adding particulate matter to resilient material is the provision of hard abrasive particles in an elastomeric matrix that are disposed at the surface of resilient material, and which are bonded to the resilient material with bond strength sufficient to hold the abrasive particles to the surface in the face of wear forces. The abrasive surface exposed in carbide impregnated tires demonstrates this kind of elastomer wear surface. Not only is tire traction increased, but under proper usage, tire life is increased. Exceptions to the latter occur when internal fretting by sharp, jagged edges leads to early expiration of the elastomeric article due to loss of strength effected when the article relieves internal stresses by developing shear planes that separate.

Numerous teachings are available in the prior art that rely upon one or both of the above described phenomena, and which discuss other reasons for adding particulate matter to elastomers as well as discussing the many problems encountered in the utilization of a particle-elastomer matrix. Examples of such are found in U.S. Pat. Nos. 3,062,255, issued to Clark et al.; 1,175,624, issued to Fawkes; 1,266,100, issued to Brown; 2,472,331 issued to Koehler; 3,093,601, issued to Gessler; 3,165,487, issued to Gardner; 3,386,840, issued to Gruber; 3,442,053, issued to Henderson; 3,462,516, issued to Smith; 3,484,405, issued to Seto; 3,507,818, issued to Roach; 1,330,973, issued to Bartholomew; 1,330,988, issued to Sayre; 2,552,500, issued to Doenhoff; 2,675,047, issued to Andy; 2,727,935, issued to Kloepfer; 2,752,979, issued to Knill; 1,412,744, issued to Hobson et al.; 1,688,491, issued to Raoul; 1,578,121, issued to Haw; 993,222, issued to Busby; 1,250,405, issued to Williams; 2,467,418 issued to Alexiadis; 2,672,910, issued to Corson; 2,690,461, issued to Steeves; 1,290,576, issued to Kendall; 1,978,301, issued to Fisher; 2,011,496, issued to Luchinger; 3,227,200, issued to Andy; 2,961,026, issued to Stanton; 1,088,845, issued to Stromeyer; 2,766,800, issued to Rockoff; and 3,666,613, issued to Beninga.

The problems encountered in the prior art include that of the selection of an ingredient that can be added to an elastomeric material that will provide adequate bond strengths at the particle-elastomer interface while not introducing internal stress as above described. Ceramic materials have been involved in many attempts in the particle-elastomer art, as is clear from the above cited prior art, but such attempts have found that the addition of alumina and the like to elastomers has met with but limited success. This is attested to by the U.S. Pat. to Beninga, No. 3,666,613, which is a teaching of how to overcome one mechanical ceramic-elastomer bond strength by coating sintered ceramic objects with a thin layer of metal. The metal is chemically bonded to the ceramic surface, and the elastomer mechanically bonds to the metal layer.

Another problem is the selection of particles that do not retain gases or moisture that are freed when the elastomer is subjected to a heated environment or otherwise meets conditions conducive to effect such escapement. When this happens, the particle may be forcefully separated from the surrounding elastomeric material. If that occurs, any method designed to increase the bond strength between the particle and the elastomer is defeated in its purpose.

SUMMARY OF THE INVENTION

The present invention provides a composite particle having surface capillarity heretofore unachieved in the art. The particle can be comprised of a suitable crystalline material bonded together by another material that has a melting point lower than the crystalline material. An alternative form is a composite particle comprised of at least two phases one of which is chemically inert relative to certain solvents (or removal chemicals) and the other is not. As will be made clear by the examples below, surface capillarity of a composite crystalline material is developed by means that effect controlled removal of the crystalline bonding material (or non-inert phase) without effecting an increase in porosity, a property undesirable because of the possibility that gases and/or moisture can be entrapped in the particle. In other words, the particle of the present invention will have superior surface capillarity while having low inner particle permeability. This leads to more area of bonding in a particle-elastomeric matrix composition, therefore providing enhanced mechanical and chemical bonding strength, and additionally providing vacumatic bonding, defined as that bonding occurring due to the partial filling of the surface capillarities by the elastomer contacting the particle.

It is a principal object of the present invention to provide a particle having improved surface capillarity, the particle characterized as being extremely hard and abrasive.

Another object of the present invention is to provide methods for imparting surface capillarity without attendant inner particle permeability to particulate materials.

Other objects, features and advantages of the invention will be evident from the following detailed description when considered in conjunction with the accompanying drawings.

THE COMPOSITE MATERIAL

The preferred composite material for the practice of the present invention is a hard, impervious material such as aluminum oxide crystals held together by slag interdisposed in the interstices thereof, slag being defined as metals such as iron, silica, and titanium and/or their oxides. These are examples only, as the present invention provides the means for broad selectivity in the makeup of the composite material.

Prior to commencing a discussion of the makeup of the composite material of the particle in the present invention, it should be noted that the composite material herein is normally not sintered. Sintering is a process of powder metallurgy or the like wherein a powdered material is formed into briquettes or other shapes by the application of heat and/or pressure to effect a partial melt so as to fuse the particles together. Also, a characteristic of the composite in the present invention is that it is heterogeneous; that is, the composite is not a pure ceramic, such as alumina, or other such material. Rather, as stated above, the composite comprises a base material that is joined together by a bonding material. As will become clear below, a controlled amount of a bonding material is added to a molten crystalline material, which can be thought of as purposefully adding a selected impurity to become interdisposed in the interstices between crystalline sub-particles of a relatively impervious material.

Figure 1:
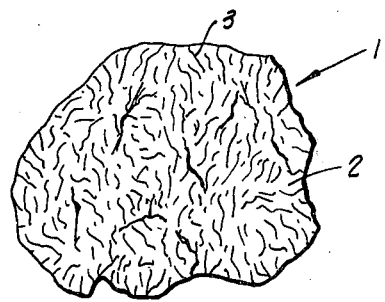
FIG. 1 is a depiction of an aggregate prior to capillarization treatment.

The preferred composite material and the one selected for illustrating the present invention is fused bauxite, an artificially treated aluminum oxide bearing ore containing a group of metallic oxide impurities. FIG. 1 is a depiction of such a particle designated 1 therein. This particle is made by fusing bauxite containing clay residue in an electric furnace at a temperature in excess of 2000° Centigrade. When the bauxite is heated to 3000° Centigrade, the aluminum oxide and clay residue produce a melt that upon cooling allows aluminum oxide crystal to form and become bonded together by the clay, which is typically: $Al_2O_3$, 39.5%; $SiO_2$, 46.5%, $H_2O$, 14%; and small amounts of iron, magnesium and titanium. Bauxite ore usually contains from 50% to 60% aluminum oxide with impurities largely comprising oxides of titanium, silica and iron. The bauxite material, upon becoming molten, is poured in pig form, cooled, and then crushed and screened to obtain the required particle sizes. The present invention is not limited to a specific particle size, as the method of developing surface capillarity herein taught may be applied to any size or shape of the composite material produced as above. For example only, it has been found that material prepared as described and screened to meet a Tyler meshing in the range of from approximately 4 to approximately 20 is particularly suitable for adding to rubber to make a particle-rubber matrix tire. Of course, such addition is made following surface capillarity preparation by the practice of the present invention as will be described below.

A commercially available material which generally meets the description of the above described preferred composite material is available under the tradename Borolon, a product of the simonds Abrasive Division of the Wallace-Murray Corporation, Philadelphia, Pennsylvania. This material has a typical chemical analysis of: $Al_2O_3$, 94.98%; $TiO_2$, 3.85%, $SiO_2$, 0.77%; and $Fe_2O_3$, 0.40%. It is again pointed out that this material, while suitable for the practice of the present invention, is not limiting, for one of the advantages of the present invention is that it provides a method operable with many composites, thereby affording wide selectivity in preparing the base particle 1 as shown in FIG. 1. Borolon is a dense, low porosity material that is made up of aluminum oxide crystals that are bonded together by the impurities which serve as the crystalline glue disposed in the interstices between adjacent aluminum oxide crystals. The resulting composite, depending upon the amount of impurities present, is usually dark in color appearance as opposed to alumina which is normally white in appearance.

Corundum, which is naturally occurring aluminum oxide as found in metamorphic rocks, pegmatites and igneous rocks, may also be used for the process of the present invention to provide a superior capillarity particle. Corundum may be of gem quality, such as ruby or sapphires, but also may be in the form of emery which is in turn a mixture of corundum, magnetite, hematite, quartz and spinel. Of course, in the latter form, the corundum will contain relatively large but variable amounts of iron and other metals.

Commercially available Alundum, trademark for fused alumina from the Norton Company, Worchester, Massachusetts, is made up of crystals of alumina bonded together at the crystal interfaces with the impurities of titania, iron, silica and soda.

SURFACE CAPILLARITY PREPARATION BY THE PRESENT INVENTION

Figures 2, 3:
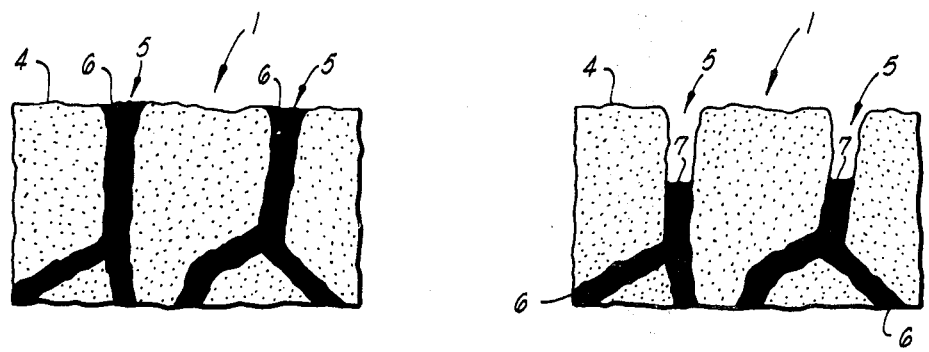
FIG. 2 is a diagrammatic enlarged view of the surface of a particle of FIG. 1 prior to capillarization treatment.
FIG. 3 is a diagrammatic view of the same surface of FIG. 2 following capillarization treatment.

In FIG. 1, the composite particle 1 comprises a base material 2, in the form of sub-particles bonded together to form the particle 1. The preferred material for the base material 2 as described above is crystalline aluminum oxide. The dark lines 3 criss-crossing in rather random rashion represent a bonding material that interlaces between the crystals or sub-particles 2; that is, the dark lines 3 represent the selected impurities which have been added to the base material 2 to form the composite particle 1, and in the preferred material, these lines represent oxides of titanium, silica and iron. FIG. 2 is a depiction of a cross-sectional view at a typical surface location of a particle of the type shown in FIG. 1. The surface 4 has numerous interstices or crevices 5 extending from the surface inwardly into the particle. The crevices 5 are filled with crystalline glue or bonding material 6.

The present invention provides for capillarization treatment to selectively remove the bonding material 6 from the surface crevices 5, as shown in FIG. 3, leaving the terminal surface 7 recessed from the surface 4. It should be noted that while some of the bonding material is removed, the removal is localized at the surface, thereby providing capillarity by the partially vacated crevices 5. The methods available to effect this selection removal process will be described in several examples that follow.

EXAMPLE I

The base particle must be subjected to a capillarization treatment to obtain the capillarity sought as an object of the present invention. Cleansing or removal of the bonding material may be effected by totally enveloping each particle in a burning gas in order to melt, volatize or otherwise remove the surface bonding material at the crystal interfaces, this being done in controlled environmental conditions so as to obtain a partial crevice evacuation.

The temperature of the burning gas must be high enough to effect sufficient heat transfer. It has been found that this temperature should exceed that required to melt the aluminum oxide for good heat transfer to occur. However, this then requires that high temperature gas, which is in excess of 2000° Centigrade, be sufficiently regulated so as to heat the particle surface to the boiling point of the slag, while not allowing exposure time sufficient to cause the inner portion of the particle to reach its melting point. In other words, it is the purpose here to remove some of the bonding material, but only at the particle's surface as shown by the evacuated crevices 5 in FIG. 3. If the evacuation is caused to penetrate too far, it would weaken the particle and probably the crystals would separate along the crevices 5 therebetween when subjected to external forces.

It is desirable that the particles being treated be evenly sized in diameter. This is because difference in particle sizes will cause variations or non-uniformity in the amount of bonding material removal. A larger particle will generally require a longer residence time in the flame because of the higher heat absorbing capacity of its inner portion.

To apply the proper amount of heat to the particles, a gas fired rotary kiln of conventional design may be utilized. The particles are tumbled in the kiln in a manner that will provide each particle several free falls through the hot gases. As the particles progress through the kiln, they acquire heat up to near melting, and the last free falls will allow the gases to heat the surfaces to well above the boiling point of the bonding material. This causes the bonding material to vaporize and be removed as smoke or fumes. It is believed that each fall through the hot gases causes the melting bonding material adhering within the crevices near the surface (due to surface tension) to be freed and knocked off the particle upon particle impact with the rotating wall of the kiln.

A kiln suggested for use in the practice of the above heating is a rotary gas fired kiln of the type manufactured by Allis Chalmers Corp., Milwaukee, Wisconsin, and which are conventional in design. Gases which may be used are acetylene, hydrogen and oxygen mixtures with forced air. These gases will permit temperatures of up to 4000° Centigrade to be used. Kilns of the type mentioned rotate on a longitudinal axis and are made with flights to lift the material to a point above the flame heated kiln center where they then free fall through the hot combustion gases.

Process parameters will need to be established for each base particle. Examples for a bauxite fused particle as described previously are as follows. A number 8 sized particle requires a pre-heat to 1200° Centigrade and it is flashed in a 3000° Centigrade gas flame during a free fall time of 0.5 second, with 6 to 10 free falls being required to achieve proper capillarity. A number 12 sized particle requires a 1000° Centigrade pre-heat and the particle is slashed in 2600° Centigrade gas temperature, with 6 to 10 free falls of 0.5 second duration.

EXAMPLE II

A second method for preparing the particle of the present invention is the immersion of the bonded subparticles in solutions of acids with the utilization of temperature and time controllers. Ultrasonic vibrations may be utilized to create mechanical mixing to effect quicker removal of the bonding material from the surface crevices.

Particles are immersed in the acid solution on a continuous screen belt. The removed slag may then be precipitated by further conventional chemical processing and the precipitates caused to fall through a screen so as to settle to the bottom of a tank. Particles are passed through a rinse cycle to neutralize and clean the particles, and then the particles are hot air dried.

Aluminum oxide particles are highly resistant and either hydrochloric acid or a very strong alkaline solution may be used to remove the slag in the utilization of fused bauxite particles. Larger particle sizes will not require appreciably more immersion time than the smaller sizes because it is the surface phenomena which is rate controlling, but there will be a chemical rate variable introduced into the process as a weak function of particle size because of the varying amount of surface area per unit volume of particles as the particle size is varied.

EXAMPLE III

In a third method of making the particle of the present invention, a suitable composite particle is given a very hot flash of burning gases in a manner that will instantaneously bring the particle's surface to a melt without causing the core of the particle to melt. The quick rise in temperature is followed by a quick cooling of the outer skin or surface of the particle, causing the skin to freeze or congeal rapidly as the heat is driven to the core of the particle. This causes the core of the particle to expand as it is heated while the skin or surface of the particle is cooling, and the shrinkage results in recticulation of the particle skin or surface. The resultant particle has the capillarity developed by bonding material removal, and additionally has the added characteristic of recticulation; that is, the particle surface has numerous crevices or cracks that occur in the surface of the base material 2 which are similar in cross section to the crevice 5, except that no bonding material or other material occupies these shrink created cracks. The method of heating the particle in this example is similar to Example I above, however, there is no pre-heat and the particle is flash heated only once and cooled more rapidly by subjecting the particle to a stream of approximately room temperature gases. The method of this example, because of the resulting reticulation, usually provides adequate capillarity without further capillarization treatment. However, it has been found that particles treated by the method of this example incur even greater capillarity when subjected to further capillarization treatment such as by a following treatment of Example I or Example II capillarization treatment.

The higher temperatures required for performing the method of this example may be obtained by the use of commercially available plasma torches. Such torches can create gas temperatures up to 15,000° Centigrade. A plasma torch is manufactured by the Plasma Dyne Corporation, Santa Ana, California.

Quick cooling of molten crystalline materials can cause crystal surfaces to become fernlike or denticulate with large crystalline projections, especially when cooling is very rapidly achieved. Another phenomena that may occur when rapid cooling is effected is thermal grooving which can occur as random, wrinkle-like canals along the outer surface of the particle. Both of these effects are beneficial to particle mixing with elastomeric materials because of the provision of more surface than is gripped by the conforming elastomeric material.

EXAMPLE IV

This example presents a deviation from the above examples in that the base particle requirement is altered. A mixture of hard acid insoluble particles and metallic iron or other highly acid soluble material is fused, or partly fused under pressure, to form a homogeneous-appearing mass. This mass is again pulverized and screened as above described, and then subjected to a capillarization treatment wherein the soluble iron (or other soluble material) is removed to effectively create a hard particle having improved surface capillarity.

Figure 4:
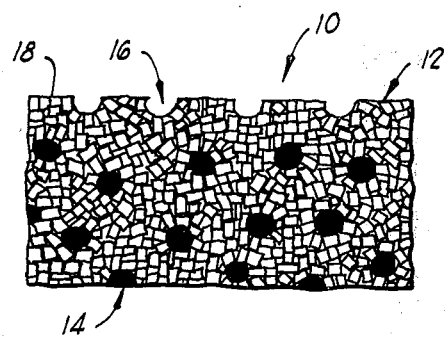
FIG. 4 is a diagrammatic view depicting another embodiment of the present invention wherein the surface of a sintered mixture particle following capillarization treatment.

An example of the above is alumina sintered with 10% ferric oxide and followed by treatment at 1700° Centigrade in a hydrogen atmosphere. This causes reduction of the oxide to metallic iron (as taught in the British Pat. No. 436,017). The resulting material is cooled and crushed to suitable particle sizes for treatment with a solution of hydrochloric acid to obtain the desired surface capillarity. The size of the iron particles in the composite particle will determine the size of the cavity produced when the iron is removed by the acid. That is, the surface will have numerous cavities caused by the removal of the iron particles, as shown in FIG. 4 which is a depiction of the surface of the particle following acid treatment. The particle 10 comprises numerous sub-particles 12 of crystalline aluminum oxide bonded together by the fusing effected by the sintering process. Interdisposed at random interspaces are the iron particles 14. The capillary like voids 16 in the surface 18 are effected by removal of the particles of iron that are randomly disposed at the surface 18 of particle 10 following the sintering and crushing of the composite.

Other possible composites include: Tungsten carbide with a cobalt binder; titanium carbide with a tungsten-nickel binder; and titanium or molybdenum carbide with a nickel binder. These mixtures are given as examples only, and the present invention is not limited to such mixtures.

THE ELASTOMER BONDING

A particle prepared by one of the methods in the above examples may be combined with an elastomer by conventional methods to form a particle-elastomer matrix. That is, by employing techniques well-known in such art as the manufacture of tires for vehicles, the capillarization treated particles may be added directly to elastomeric compositions, or binding agents may be first applied to the treated particles to effect a particle-binding agent bond prior to dispersion of the particles in uncured elastomer for the manufacture of tires.

Unlike the results normally obtained by additions of hard-abrasive particles to elastomeric compounds, the composite particle of the present invention gives superior bonding to the elastomer heretofore unachieved by any prior art teachings. The reason for the superior bonding achieved is due to the development of the capillaries or evacuated crevices 5 as depicted in FIG. 3, allowing the elastomer or the binding agent to procure a superior grip on the particle. Additionally, the increased surface area of the prepared particle provides more area of bonding, thereby increasing both mechanical and chemical bonding of the elastomer to the particle. Another bonding force is also created, that of vacumatic bonding, when the elastomer partially fills the manufactured surface capillaries. Withdrawal of the elastomer from the crevices is resisted by the vacuum atmosphere which would be created by such removal, because of the lack of compensating surrounding gases to fill such a void.

Prior to particle exposure at the surface of an elastomer-particle composition made with the composite particle of the present invention, the particle is totally enclosed and has chemical, mechanical and vacumatic bonding which sustains the particle in bonded relationship through millions of flexures of the elastomer-particle compound, such as in an automobile tire. The result of using the composite particle of the present invention in an elastomeric material has been demonstrably marked improvement in life and traction characteristics of automobile tires and the like.

It will be apparent from the foregoing, to those skilled in the art, that the composite particle herein described, has superior surface capillarity and bonding characteristics heretofore unachieved in the art. Changes may be made in the applications of the art as discussed herein without departing from the spirit and the scope of the invention as defined in the following claims.

What is claimed is:

1. A composite particle-elastomeric material comprising a plurality of composite particles mixed with an elastomeric material, the composite particles comprising abrasive subparticles connected by a bonding material and having numerous surface capillaries formed by subjecting the composite particles to capillarization treatment, said capillarization treatment comprising the step of subjecting the particles, prior to mixing with the elastomeric material, to a process whereby capillaries are formed in the surface of the particles by the selective partial removal of the binder at the surface of the particle.

2. A particle comprising abrasive subparticles connected by bonding material, the subparticles having surface reticulation formed by subjecting the particle to a first capillarization treatment including rapidly heating of the surface to a molten temperature and then rapidly cooling the particle, and the particle having numerous surface capillaries formed by subjecting the particle to a second capillarization treatment for partially removing the bonding material disposed between the subparticles to have a terminal surface recessed from the surface of the particle, said bonding material and abrasive subparticle material being predetermined whereby said capillarization treatment effectuates controlled bonding material removal at the surface of the particle without effectuating removal of the abrasive material.

* * * * *